United States Patent
Kakuma et al.

[11] Patent Number: 6,078,585
[45] Date of Patent: *Jun. 20, 2000

[54] MULTISTAGE CONNECTION SWITCH AND EXTENSION METHOD

[75] Inventors: Satoshi Kakuma; Shiro Uriu, both of Kanagawa, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/619,966

[22] Filed: Mar. 20, 1996

[30] Foreign Application Priority Data

Mar. 20, 1995 [JP] Japan ................................. 7-061157

[51] Int. Cl.[7] ........................................... H04L 12/56
[52] U.S. Cl. ................................... 370/395; 370/388
[58] Field of Search ............................ 370/354, 356, 370/360, 381, 367, 369, 370, 372, 373, 375, 380, 386, 388, 387, 389, 392, 395, 396, 397, 400, 351, 359, 361, 399; 340/825.79, 825.8

[56] References Cited

U.S. PATENT DOCUMENTS

| | | | |
|---|---|---|---|
| 4,392,218 | 7/1983 | Plunkett | 379/75 |
| 4,807,280 | 2/1989 | Posner et al. | 379/279 |
| 4,907,253 | 3/1990 | Watrous | 379/16 |
| 5,210,744 | 5/1993 | Yamanaka et al. | 370/413 |
| 5,325,090 | 6/1994 | Goeldner . | |
| 5,555,243 | 9/1996 | Kakuma et al. | 370/352 |

FOREIGN PATENT DOCUMENTS 5-130130  5/1993  Japan .

OTHER PUBLICATIONS

A Growable ATM Switching Fabric Architecture vol. 43 (1995) Feb./Apr., No. 2/4, PT 11, New York, US.

*Primary Examiner*—Dang Ton
*Attorney, Agent, or Firm*—Helfgott & Karas, P.C.

[57] ABSTRACT

Four SR modules are provided in the second stage of a 3-stage MSSR switch. To guarantee the MSSR switch the capacity of 20 Gbps, SR modules are provided in each of the first and third stages of the switch. When the capacity of the MSSR switch is extended from 20 Gbps to 40 Gbps, SR modules are added to both of the first and third stages and connected to the four SR modules in the second stage. To further extend the capacity of the MSSR switch to 60 or 80 Gbps, the SR modules are sequentially added to the first and third stages, and the newly provided SR modules are connected to the four SR modules in the second stage.

3 Claims, 15 Drawing Sheets

SWITCHING ELEMENT

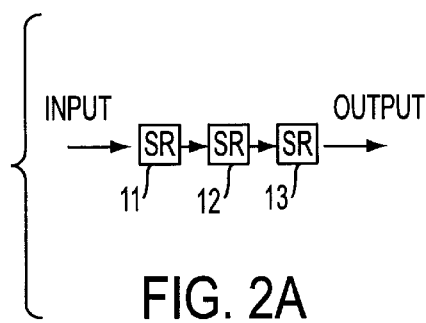
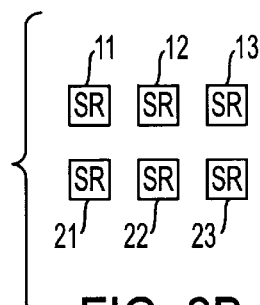
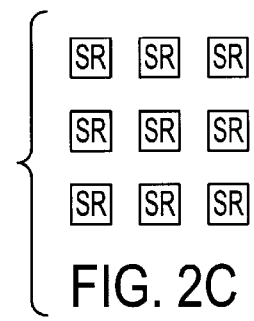
FIG. 2A
PRIOR ART
FIG. 2B
PRIOR ART
FIG. 2C
PRIOR ART
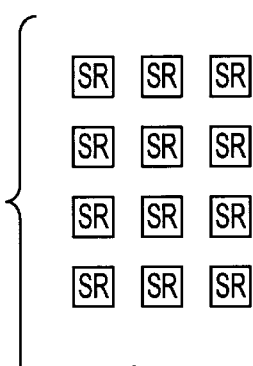
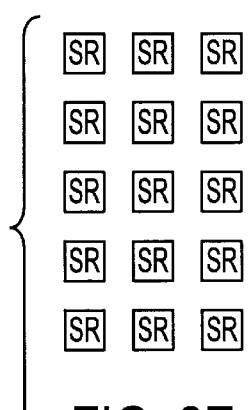
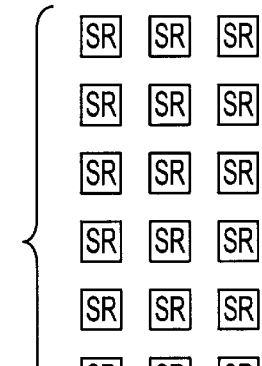
FIG. 2D
PRIOR ART
FIG. 2E
PRIOR ART
FIG. 2F
PRIOR ART
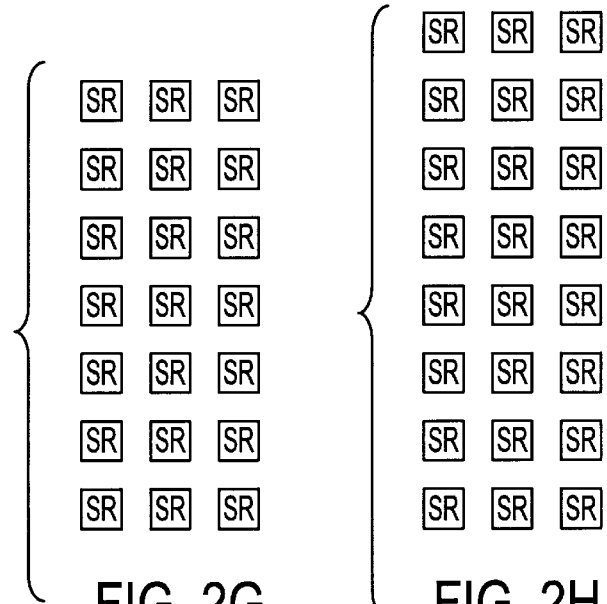
FIG. 2G
PRIOR ART
FIG. 2H
PRIOR ART

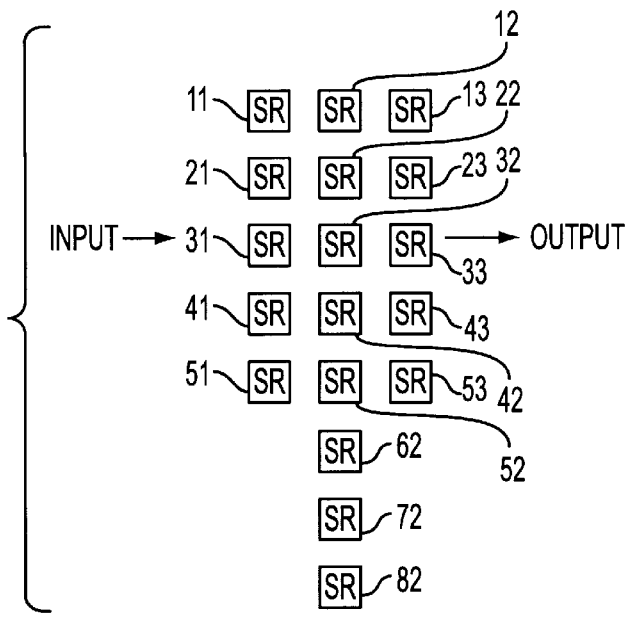
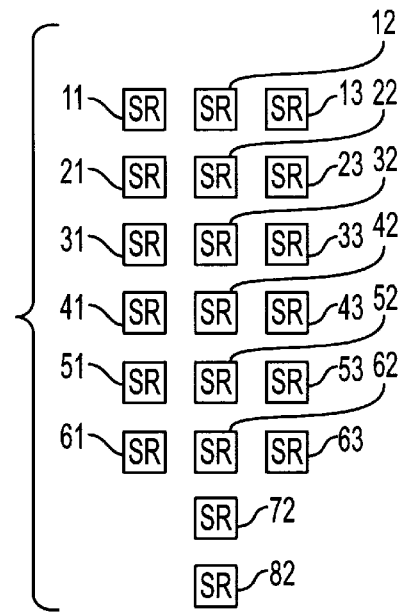
FIG. 12A  FIG. 12B
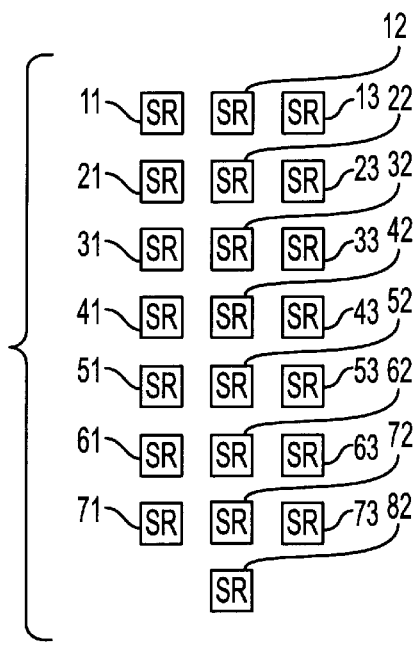
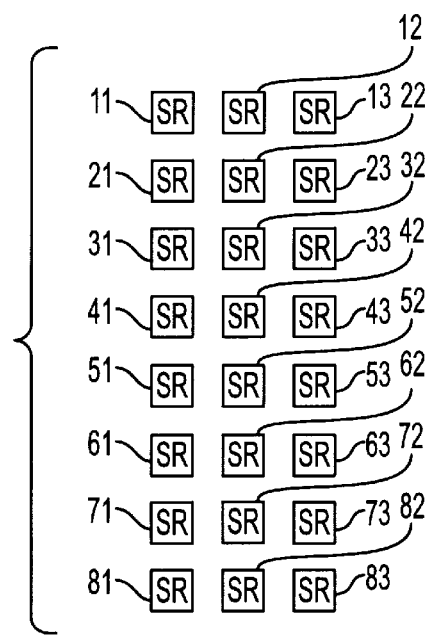
FIG. 12C  FIG. 12D

MULTISTAGE CONNECTION SWITCH AND EXTENSION METHOD

BACKGROUND OF THE INVENTION

1. Field of the Invention

The present invention relates to a method of extending a multistage switch, and more specifically to a method of extending a multistage self-routing (MSSR) switch.

2. Description of the Related Art

Recently, the requests for communications services have diversified, and various services are now being provided to transfer image data including animation data, in addition to voice and data communications services. These services are different from one another in the transmission speed, protocol, etc. of data, and required to be processed in one system. An asynchronous transfer mode (ATM) system has become a practical example of one of the systems for processing these services.

In an ATM network, information in the various services is transferred in fixed length cells. A cell consists of a 5-byte header and a 48-byte payload field. The header stores cell routing information comprising a virtual path identifier (VPI) and a virtual channel identifier (VCI). The payload field stores user information to be transferred.

The cell is transferred through the communications line specified by a VPI/VCI and input to an ATM switch. In the ATM switch, an output VPI/VCI and tag information are retrieved according to the VPI/VCI of the input cell, so that the input VPI/VCI is rewritten to an output VPI/VCI and the tag information is added to the head of the cell. The tag information specifies a path in the ATM switch.

The ATM switch normally consists of a plurality of switching modules. Each switching module forms a matrix of m×n switching elements and is connected by a plurality of input and output highways. FIG. 1 shows the configuration of a switching module having a matrix of 8×8 switching elements.

When a cell is input to the ATM switch and then input from a predetermined input highway to a switching module, a route in the switching module is automatically selected according to the tag information assigned to the cell, and it is output through the output highway. Thus, since the route of the cell in the switching module is autonomously determined by the cell itself, such a switching module is referred to as a self-routing switching module (SR module).

The ATM switch is normally designed as an MSSR. That is, the SR module is connected to multiple stages. The number of stages of the SR modules depends on the required flexibility in selecting a route in the switch and allowable transmission delay time. For example, a 3-stage configuration is normally adopted. FIGS. 2A through 2H show examples of the schematical configurations of the MSSR switches provided with 3-stage SR modules.

FIG. 2A shows an example of the configuration of the MSSR switch when three SR modules 11 through 13 of the same type are provided for each stage in line. The cell input to the MSSR switch shown in FIG. 2A is output after being switched first by an SR module 11 in the first stage, and then by an SR module 12 in the second stage, and an SR module 13 in the third stage.

The switching capacity of the MSSR switch depends on its configuration. Assuming that, for example, the capacity of the SR module is 20 Gbps, the capacity of the 1-row MSSR switch shown in FIG. 2A is 20 Gbps.

When the capacity of the MSSR switch shown in FIG. 2A is to be extended, one SR module is added to each stage as shown in FIG. 2B to form a 2-row MSSR switch. Thus, the cell input to this MSSR switch is output after being first switched by the SR module 11 or 21 in the first stage, then switched by the SR module 12 or 22 in the second stage, and finally switched by the SR module 13 or 23 in the third stage. Therefore, the capacity of the MSSR shown in FIG. 2B is double the capacity of the configuration shown in FIG. 2A. That is, the capacity can be doubled by reconfiguring a 1-row MSSR switch into a 2-row MSSR switch.

When the switching capacity of the MSSR switch is further extended, SR modules of the same type are added in 3-module units (a module for each stage) to form a 3-row, 4-row, . . . , and 8-row MSSR switches as shown in FIGS. 2C through 2H. Thus, the capacity of the MSSR switch can be extended three times, four times, . . . , and eight times.

Extending the number of the SR modules in each stage of the MSSR switch to increase the number of the rows of the MSSR switch is called the simple extension method.

In the 3-stage MSSR switch, the SR modules are connected by cables between the first stage and the second stage, and between the second stage and the third stage. FIG. 3 shows an example of connecting the 2-row MSSR switch shown in FIG. 2B using cables. Hereinafter, the SR modules are explained as formed by a matrix of 8×8 elements as shown in FIG. 1.

As shown in FIG. 3, in the 2-row MSSR switch configured by the simple extension method, eight outputs from each SR module in the first stage are connected to the SR modules 12 and 22 (four outputs to each module) in the second stage. In the example shown in FIG. 3, the SR module 11 is connected to the SR module 12 through cables 101 through 104. The SR module 11 is connected to the SR module 22 through cables 105 through 108. Likewise, eight inputs of each SR module in the third stage are connected to the SR modules 12 and 22 (four outputs to each module) in the second stage.

FIG. 4 shows an example of connecting the 3-row MSSR switch shown in FIG. 2C using cables. In the 3-row MSSR switch, eight outputs (3, 3, and 2 outputs) of the SR modules in the first stage are connected to the three SR modules in the second stage. The connection can be optionally set. In FIG. 4, the SR module 11 is connected to the SR module 12 through cables 101 through 103. The SR module 11 is connected to the SR module 22 through cables 104 through 106. The SR module 11 is connected to the SR module 32 through cables 107 and 108. Similarly, modules are connected between the second and third stages through 2 or 3 cables depending on the positions.

The cables should be reassigned between the first and second stages or the second and third stages when the SR modules 31 through 33 are added to extend the capacity of MSSR switch from the 2-row configuration to the 3-row configuration by the simple extension method, as clearly shown in FIGS. 3 and 4. That is, the cable 104 which connects the SR module 11 to the SR module 12 in the 2-row configuration should be reassigned in the 3-row configuration such that it connects the SR module 11 to the SR module 22. Such cable reassigning operations are also performed not only on the cable 104 but also many other cables. When an already assigned cable is moved, a special technique is required to assure the reliability of the connected points, thereby resulting in complicated processes with an increasing number of cables.

If the above described cable reassigning operation is performed, cell passage routes may be changed. Therefore, the connection admission control (CAC) is performed again on each SR module to reset the route again so that each SR module can be efficiently switched.

Designing the MSSR switch using the simple extension method produces the problem of a block rate. The block rate is described below with reference to FIG. 4.

For example, when a cell is input to the SR module 11 and is to be output to an output highway connected to the SR module 23, the cell can follow three routes through the SR modules 12, 22, or 32.

In the route through the SR module 12, the first stage is connected to the second stage via the three cables 101 through 103, and the second stage is connected to the third stage via the three cables 201 through 203. Since the number of the cables between the first and second stages is the same as that between the second and third stages, a cell transferred from the SR module 11 to the SR module 12 is transferred to the SR module 23 without being discarded.

In the route through the SR module 32, the first stage is connected to the second stage via the two cables 107 and 108, and the second stage is connected to the third stage via the three cables 206 through 208. Since the number of the cables between the first and second stages is smaller than that between the second and third stages, a cell transferred from the SR module 11 to the SR module 32 is transferred to the SR module 23 without being discarded.

In the route through the SR module 22, the first stage is connected to the second stage via the three cables 104 through 106, and the second stage is connected to the third stage via the two cables 204 and 205. Since the number of the cables between the first and second stages is larger than that between the second and third stages, a part of the cells transferred from the SR module 11 to the SR module 22 will be discarded without being transferred to the SR module 23. If it is possible for cells input to the MSSR switch not to be output through the MSSR switch, the logically calculated ratio of the cells which cannot be output to the input cells is referred as the block rate of the MSSR switch.

The block rate of the route from the SR module 11 to the SR module 23 in the above example is calculated as follows, assuming that the SR modules are the same type and an equal band is assigned to each cable.

Block Rate=1−(number of effective cables between second and third stages)÷(number of effective cables between first and second stages)

=1−(3+2+2)÷(3+3+2)=0.125 =12.5%

As shown in FIG. 4, the SR module 32 is connected to the SR module 23 via three cables whereas the SR module 11 is connected to the SR module 32 via two cables. If two cables are provided between the SR module 32 and the SR module 23, the cell transferred from the SR module 11 to the SR module 32 can be transferred to the SR module 23 without being discarded. When the cell is routed from the SR module 11 to the SR module 23, two cables can be provided between the SR module 32 and the SR module 23, thereby the number of the effective cables between SR module 32 and SR module 23 being taken as two in the above calculation.

When the block rate of the 3-stage MSSR switch is to be obtained, the above mentioned calculation is performed on the route from any SR module in the first stage to any SR module in the third stage. The maximum value (worst value) of the calculated values is defined as the block rate of the MSSR switch. Table 1 shows the block rate obtained when the 3-stage MSSR switch designed using the simple extension method is extended from the first to eighth rows sequentially.

TABLE 1

| Row Number | 1 | 2 | 3 | 4 | 5 | 6 | 7 | 8 |
|---|---|---|---|---|---|---|---|---|
| Block Rate | 0% | 0% | 12.5% | 0% | 25% | 25% | 12.5% | 0% |

When the 3-stage MSSR switch is extended using the simple extension method as shown in Table 1, the block rates of the 1-, 2-, 4-, and 8-row switch indicate 0% whereas the block rates of the 3-, 5-, 6-, and 7-row switch indicate values other than 0%.

If the block rate is not 0%, the use rate of the MSSR switch should be reduced. That is, with the MSSR switch (for example, in the 3-row configuration) having a block rate of 12.5%, if the sum of the bands requested by calls (subscribers) exceeds 87.5% of the switching capacity, then calls may not be established. That is, to guarantee the band of the path in the MSSR switch, the use rate of the switch should be equal to or lower than 87.5%. Therefore, such an MSSR switch should be extended when the sum of the requested bands has reached 87.5% of the switching capacity. Thus, the hardware resources cannot be used efficiently.

As described above, the simple extension method has the demerits that the cables should be reassigned, that the path should be reestablished, and that the resources cannot be used efficiently due to the block rate. To solve these problems, the 2nd-stage full extension method has been developed.

As shown in FIG. 5, the 2nd-stage full extension method refers to the method of providing the largest possible number of SR modules at the second stage of the MSSR switch at the initial implementation. In this example, since each SR module has eight inputs and outputs, eight SR modules 12, 22, 32, 42, 52, 62, 72, and 82 are provided in the second stage.

The configuration shown in FIG. 5 is applied to the MSSR switch having the smallest switching capacity using the 2nd-stage full extension method. The first and third stages are respectively provided with a switching module 11 and a switching module 13. Eight outputs of the SR module 11 are individually connected to the eight SR modules in the second stage. Each output of the eight SR modules is connected to the SR module 13 in the third stage.

When the capacity of the MSSR switch is extended using the 2nd-stage full extension method, an SR module 21 is provided in the first stage and an SR module 23 is provided in the third stage as shown in FIG. 6. Each of the eight outputs of the SR module 21 is connected to the eight SR modules 12, 22, 32, 42, 52, 62, 72, and 82 in the second stage. Each of the outputs of the eight modules is connected to the SR module 23 in the third stage. In FIG. 6, cables from the SR module 11 or to the SR module 13 are omitted for clarity of the figure. The cables shown in FIG. 5 are used as is. When the switching capacity is further extended, the SR modules are added to the first and third stages sequentially, and each of the added SR modules is connected to the eight SR modules in the second stage via cables.

Thus, according to the 2nd-stage full extension method, the SR modules can be extended using only additional cables. That is, it is not necessary to reassign cables between SR modules after removing them from other SR modules. It is also not necessary to redefine a path in the MSSR switch. Since the number of cables between SR modules is same and the connection of the cables between the first and second stages is in symmetry with the connection of the cables between the second and third stages (the second stage shows a regular configuration), the block rate is 0%.

However, according to the 2nd-stage full extension method, more SR modules are required than in the simple extension method. For example, a basically equal switching capacity is required by the 1-row MSSR switch by the simple extension method as shown in FIG. 2A and by the initially-configured (1-row) MSSR switch using the 2nd-stage full extension method as shown in FIG. 5. However, the number of SR modules in the 2nd-stage full extension method is 3.3 times more than that in the simple extension method (3 modules in the simple extension method; and 10 modules in the 2nd-stage full extension method). Since the SR modules are expensive, the 2nd-stage full extension method is less advantageous in cost than the simple extension method.

As explained above, the simple extension method and the 2nd-stage full extension method are adopted in extending the MSSR switch. However, no methods are recommended in consideration of the cost, operability, or efficiency in resources.

SUMMARY OF THE INVENTION

The present invention has been developed to solve the above listed problems, and aims at providing the method of extending the switch with great effectiveness in cost, operability, and efficiency of the resources.

The method of extending a multistage connection switch according to the present invention for use with a multistage connection switch, comprising an input stage having at least one switching module, an output stage having at least one switching module, and an intermediate stage provided between the input stage and output stage, having at least one stage, comprises the steps of initially setting a number of switching modules corresponding to the estimated largest switching ability in each stage of the intermediate stage; providing a predetermined number of switching modules in the input and output stages for extending the switch; and connecting each switching module provided in the input stage and output stage, to the switching module provided at a predetermined position in the intermediate stage.

The multistage connection switch according to the present invention comprises an input stage having a switching module for switching a path of a cell and predetermined number N of switching modules; an output stage having a predetermined number N of the switching modules; and an intermediate stage having at least one stage, and initially having, in each stage, a number of switching modules corresponding to the estimated largest switching ability, as being connected to each of the switching modules provided in the input and output stages.

Adopting such a stepwise switch configuration method depending on the switching requirements reduces the amount of operations in the cable reassignment process when the switch is extended, and also reduces the required cost.

Furthermore, assuming that N (natural number) inputs/outputs are provided for the switching modules provided in the input stage and output stage, the number of the switching modules provided in the intermediate stage is a divisor of the number of inputs/outputs provided for the switching module. Since the inputs/outputs of each switching module provided in the intermediate stage are connected via a same number of cables, the connection of the input terminal is in symmetry with that of the output terminal at the intermediate stage. Therefore, the block rate can be set to 0, and the switching modules can be operated for the full switching capacity.

If a plurality of submodules form each switching module provided in the intermediate stage, the configuration of each switching module in the intermediate stage can be optimized depending on the ability of the switching unit, thereby removing any waste of switching elements, etc.

Other objects and features of the present invention are clearly described below by referring to the attached drawings.

BRIEF DESCRIPTION OF THE DRAWINGS

FIGS. 2A through 2H show the simple extension method in the 3-stage MSSR switch, each showing the 1-row through 8-row configurations;

FIGS. 12A through 12D show the procedure of extending the MSSR switch of the large-scale switching unit according to the stepwise 2nd-stage full extension method, and respectively show the configurations for 100 Gbps, 120 Gbps, 140 Gbps, and 160 Gbps;

DESCRIPTION OF THE PREFERRED EMBODIMENTS

Figure 7:
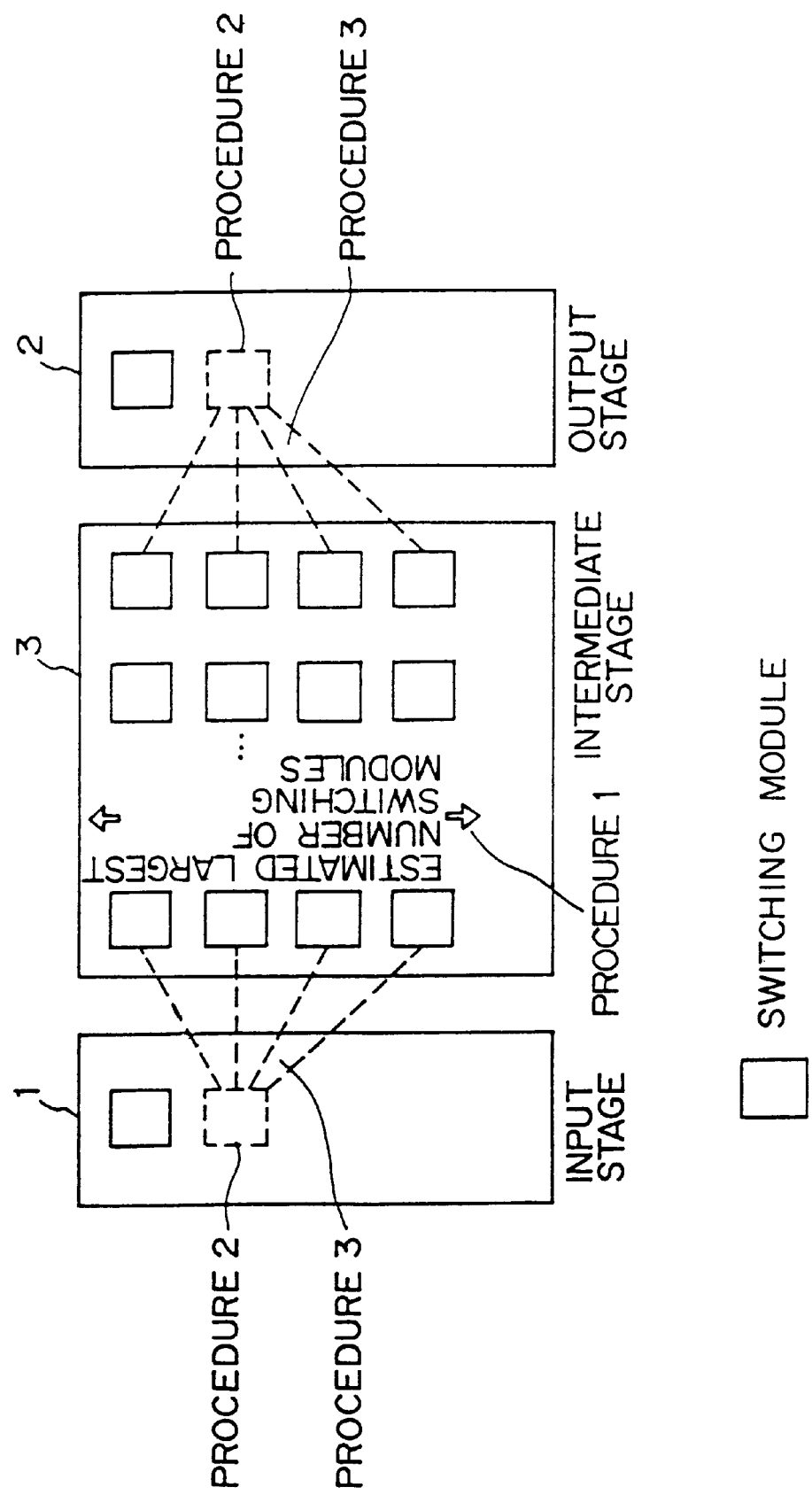
FIG. 7 shows the principle of the present invention.

The procedure of realizing the present invention is described by referring to FIG. 7.

The method of extending the multistage connection switch according to the present invention is based on an input stage 1 having at least one switching module; an output stage 2 having at least one switching module; and an intermediate stage 3, provided between the input stage 1 and the output stage 2, having at least one stage. This method comprises the following procedures.

In procedure 1, a number of switching modules corresponding to the estimated largest switching ability are initially provided in each stage of the intermediate stage 3.

In procedure 2, a predetermined number of switching modules are provided in the input stage 1 and output stage 2 when the switch is extended.

In procedure 3, each of the switching modules provided in the input stage 1 and output stage 2 is connected to the switching module provided in a predetermined position of the intermediate stage 3. The switching module provided in a predetermined position refers to either a switching module belonging to the first and last stages in-the intermediate stage 3 when the intermediate stage 3 is formed by a plurality of stages, or to a switching module belonging to the one stage when the intermediate stage 3 comprises the one stage only.

Each switching module refers to a self-routing switching module (SR module) for switching, for example, ATM cells, and a multistage self-routing (MSSR) switch comprises the input stage 1, output stage 2, and intermediate stage 3.

The switching module can be configured by combining a plurality of submodules, and a module (partially-implemented module) comprising a predetermined number (for example, 1) of submodules can be provided as each switching module of the intermediate stage 3.

The above described switching module can comprise N (natural number) inputs and outputs to provide in each stage of the intermediate stage 3, the number of switching modules being a divisor of N and corresponding to the estimated largest switching ability.

According to the method of extending the multistage connection switch of the present invention, the number of switching modules corresponding to the estimated largest switching ability are provided in the intermediate stage 3. Therefore, the number of switching modules initially provided in the intermediate stage 3 is not unnecessarily large, thereby reducing the required cost.

Since the number of switching modules corresponding to the estimated largest switching ability are initially provided in the intermediate stage 3, the cables connecting the switching modules already provided at the input stage 1 and output stage 2 to the intermediate stage 3 are used as is when the switching modules are extended. When the desired number of switching modules are added to the input stage 1 and output stage 2, the newly added switching modules are connected to the switching modules provided in the predetermined position of the intermediate stage 3. In this extension procedure, the cables are not reassigned.

If each of the switching modules of the intermediate stage 3 is a partially-implemented module, the partially-implemented module has less number of submodules and costs less to produce than normal switching modules, thereby realizing the multistage connection switches at a lower cost.

Assuming that the number of switching modules provided in each stage of the intermediate stage 3 is a divisor of N, N outputs or inputs of each of the switching modules of the input stage 1 or output stage 2 can be connected uniformly to each switching module of a predetermined stage in the intermediate stage 3.

Figure 1:
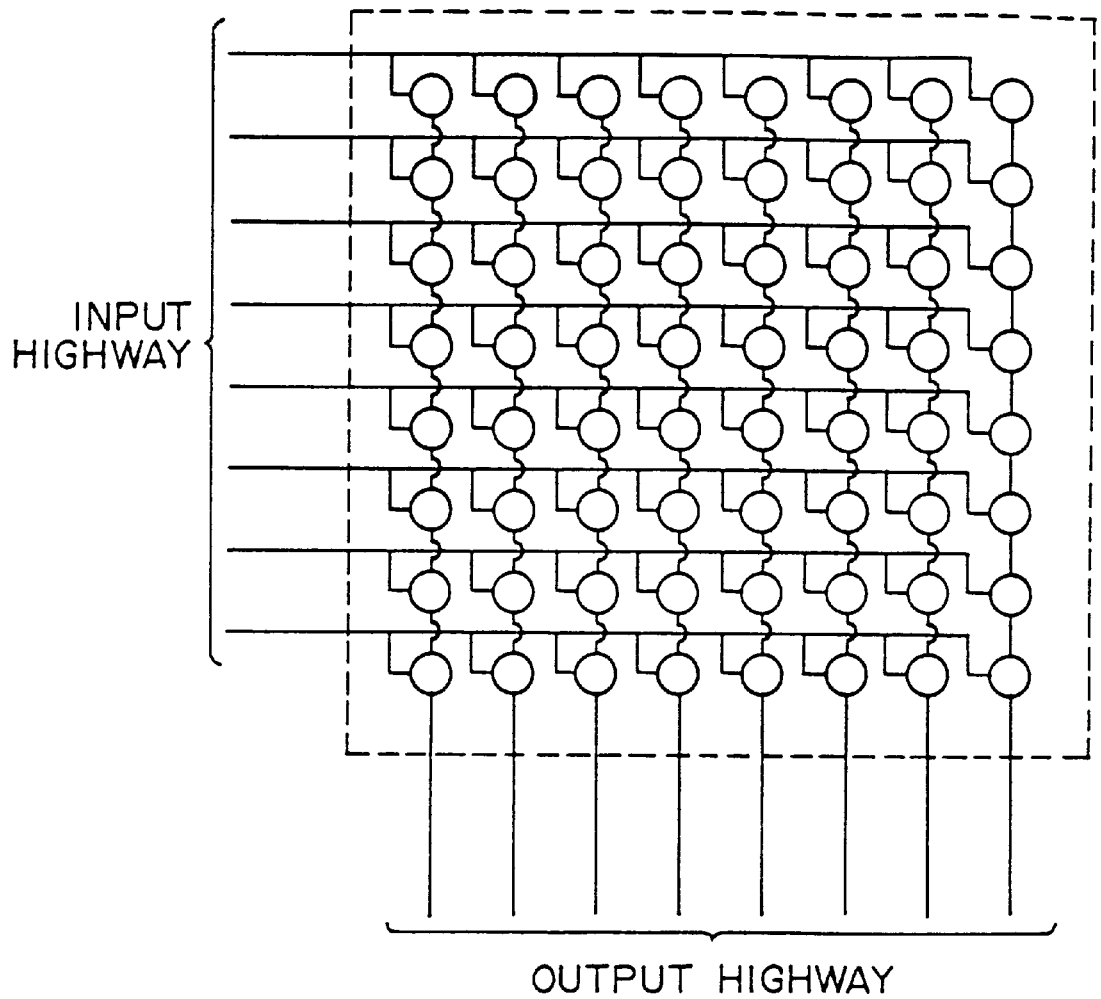
FIG. 1 shows the configuration of the SR module comprising 8×8 switching elements.
Figure 3:
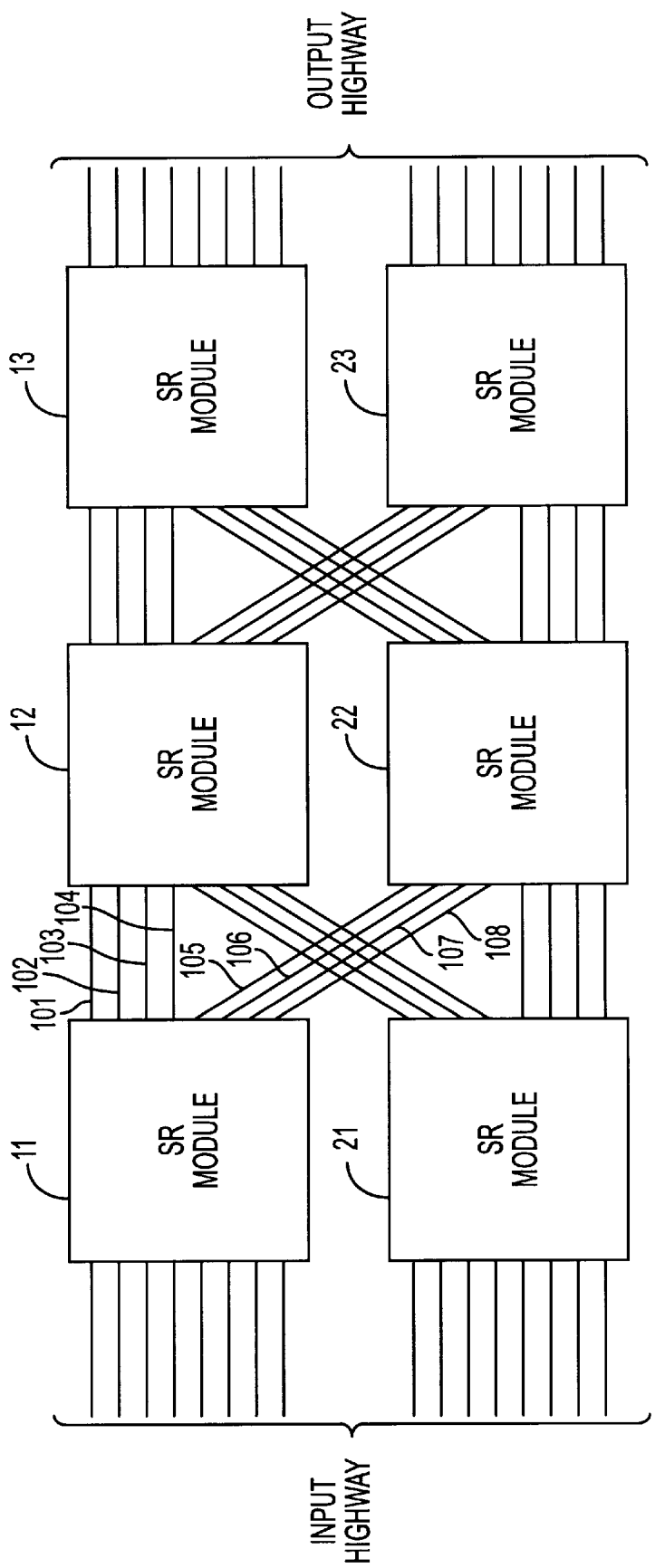
FIG. 3 shows an example of connecting cables when the 2-row MSSR switch is configured using the simple extension method.
Figure 4:
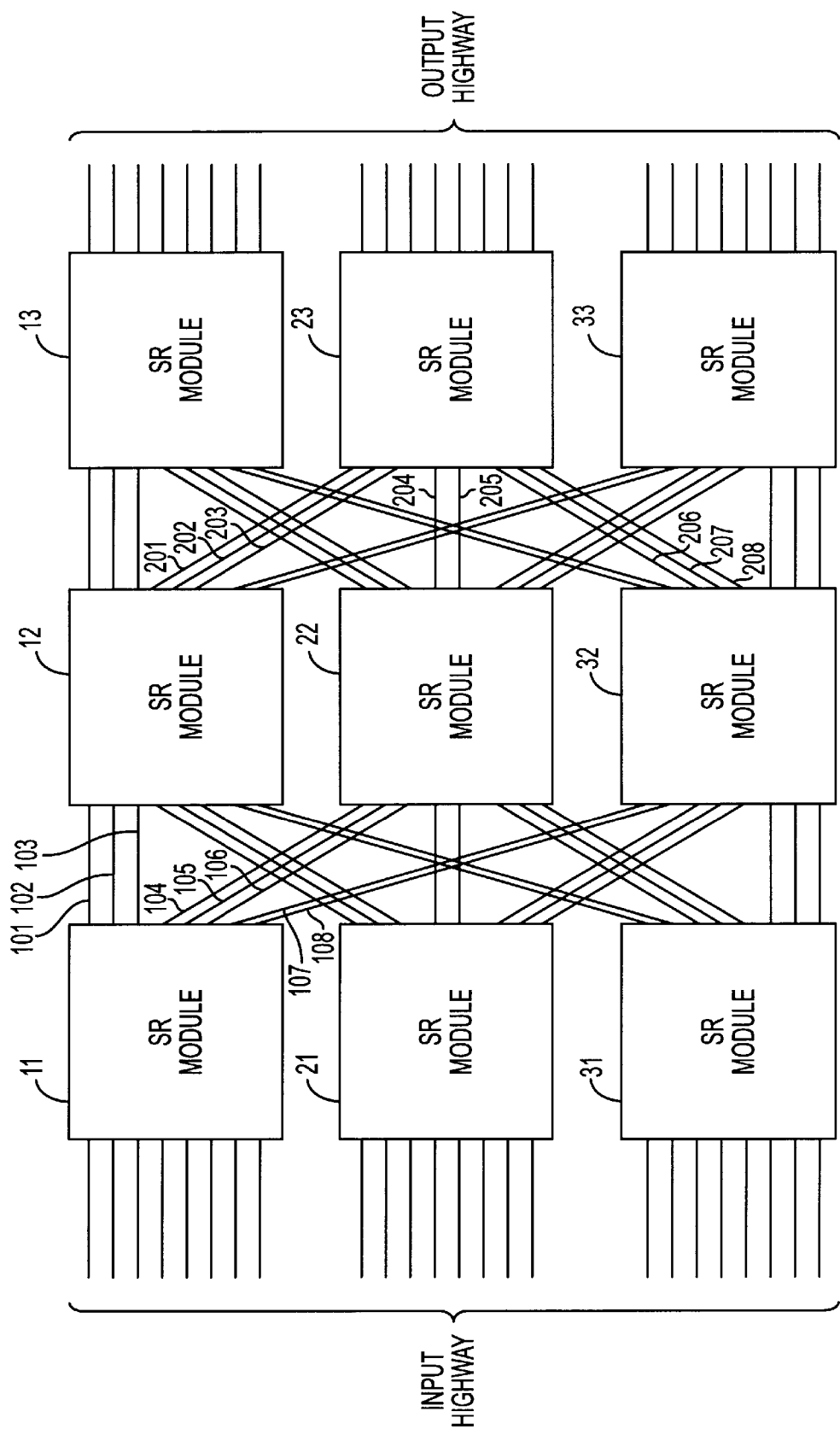
FIG. 4 shows an example of connecting cables when the 3-row MSSR switch is configured using the simple extension method.
Figure 5:
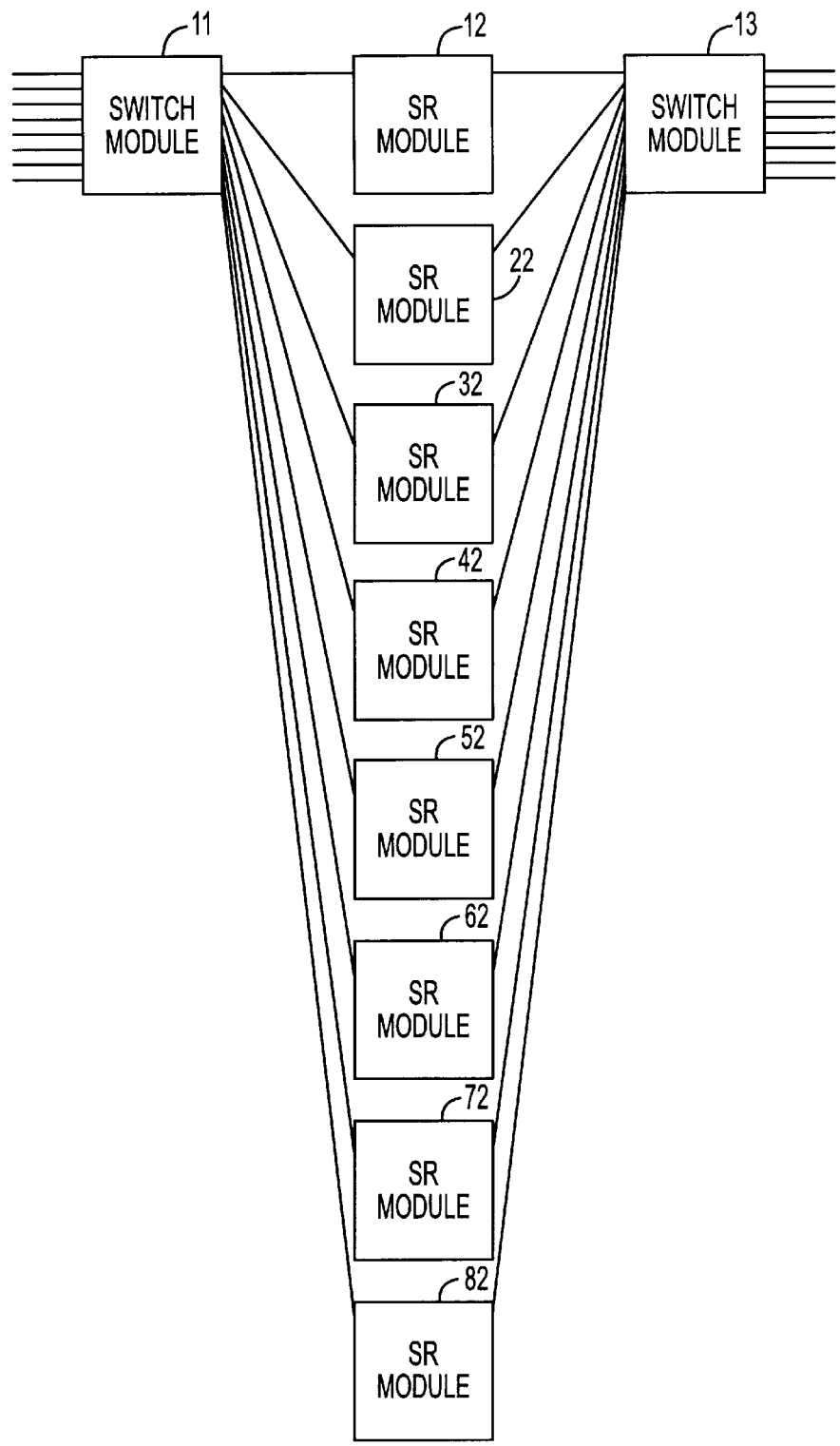
FIG. 5 shows the initial settings using the 2nd-stage full extension method.
Figure 6:
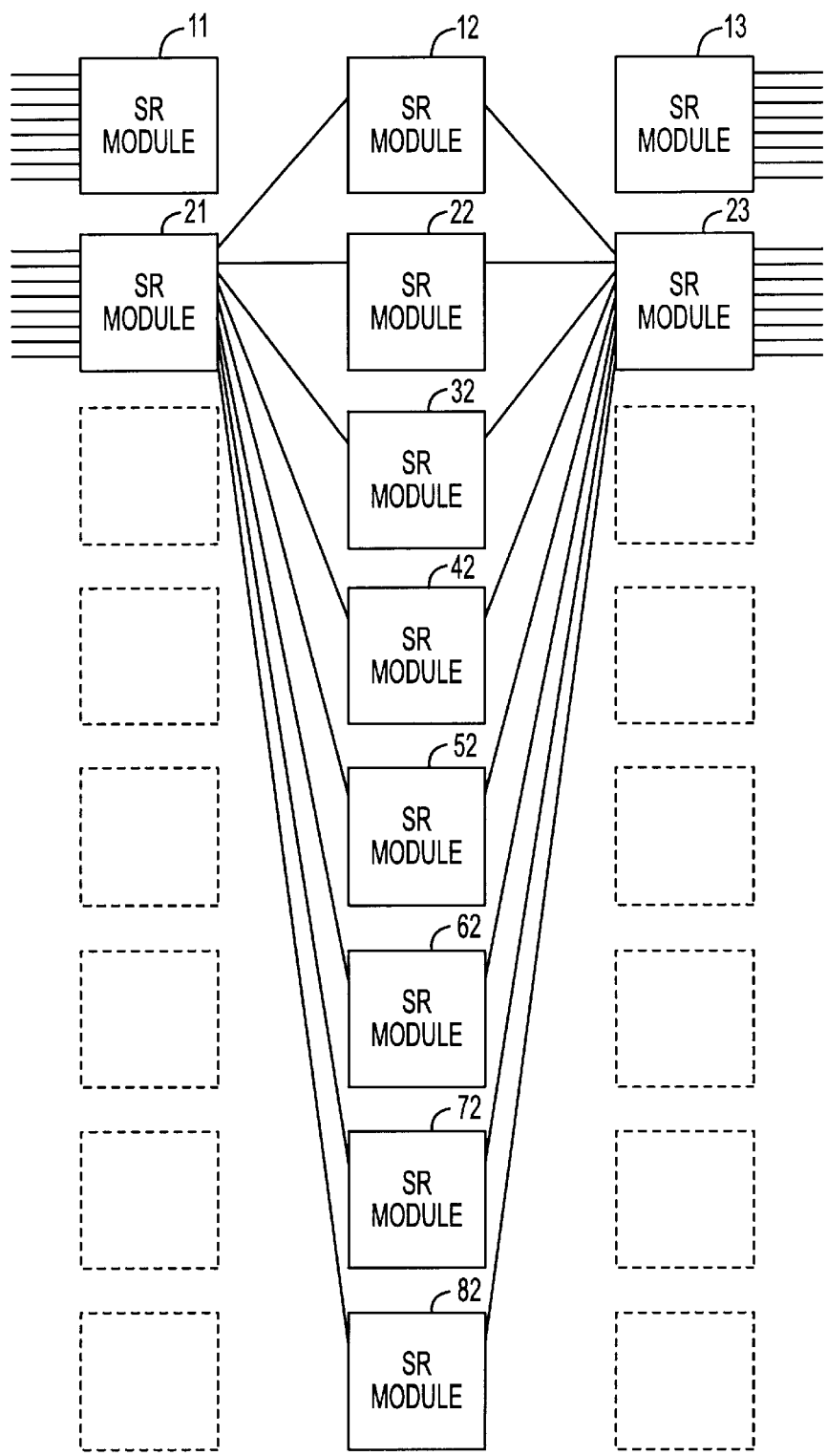
FIG. 6 shows the extension procedure using the 2nd-stage full extension method.

According to the embodiment of the present invention, a 3-stage MSSR switch is extended as described below. Each SR module forming part of the MSSR switch has the 8×8 configuration shown in FIG. 1. The SR module contains eight input and output highways, and each highway is assigned a 2.4 Gbps band. Therefore, the switching capacity of one SR module is about 20 Gbps.

The switching capacity required for a switching unit depends on the type of service. In a region where the service given is the transmission of voice and data, the capacity is 10–50 Gbps. If the service provided is the transmitting of images, such as video on demand, the capacity can be 100–150 Gbps. That is, there are two sizes of the switching unit. With the switching unit of 10–50 Gbps capacity, it is operated with the switching capacity of 10–20 Gbps at the time of initial operation. When the sum of the subscribers' request bands becomes larger with an increasing number of subscribers, the switching capacity can be extended up to several 10 Gbps so that the switching unit can provide sufficient services. Such switching units are referred to as middle-scale switching units. With a switching unit of 100 Gbps capacity, it is operated with the switching capacity of about 100 Gbps at the time of initial operation. With an increasing number of subscribers, the switching capacity can be extended to 150 Gbps or more. Such switching units are referred to as large-scale switching units.

The method of extending the MSSR switch explained according to the present embodiment is referred to as a stepwise 2nd-stage full extension method. In the stepwise 2nd-stage full extension method, the size of the switching unit (switching capacity) is estimated taking the future extension into account, and the maximum number of the SR modules for the estimated switching unit are provided in the second stage of the MSSR switch at the time of initial operation. In this case, the number of the SR modules provided in the second stage of the MSSR switch is a divisor of the number of input or output highways of each SR module. For example, with the middle-scale switching unit having a switching capacity up to several 10 Gbps, since eight input/output highways are provided for each SR module, four SR modules are provided in the second stage of the MSSR switch at the time of initial operation. With the large-scale switching unit having a switching capacity of 100 Gbps or more, eight SR modules are provided in the second stage of the MSSR switch at the time of initial operation.

Figure 8:
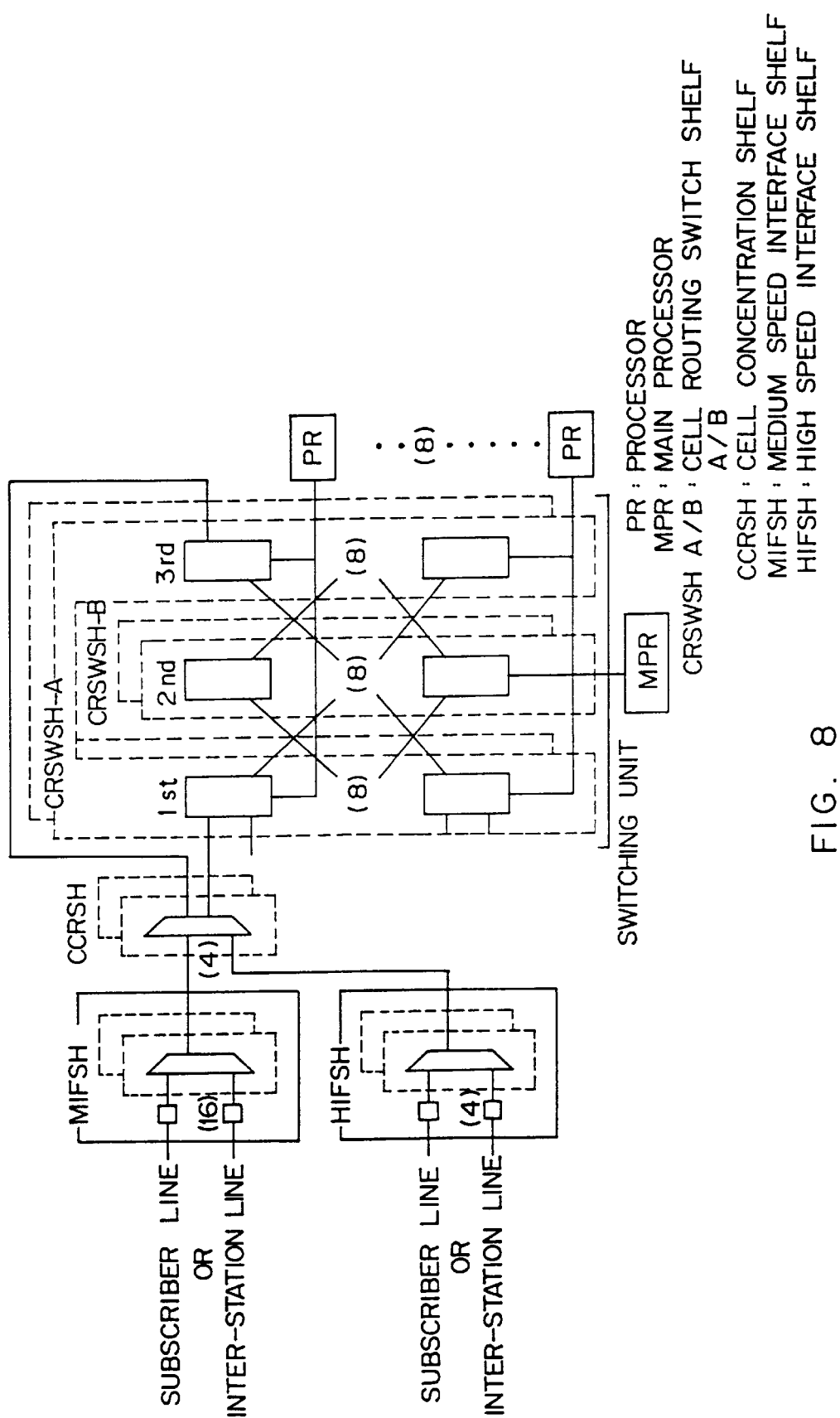
FIG. 8 shows a configuration of the entire switch according to the present invention.

FIG. 8 shows the configuration of the entire switch according to the present invention.

A high speed interface shelf (HIFSH) and medium speed interface shelf (MIFSH) accommodate subscriber lines or inter-station lines to transmit cells. The HIFSH and MIFSH convert cells transferred through the subscriber or inter-station lines into the format in which the cells are switched by the switching unit. Then, the HIFSH and MIFSH input the cells to the switching unit. They also output the cells switched by the switching unit to predetermined subscriber lines or inter-station lines. With the configuration, the HIFSH contains four subscriber or inter-station lines. Likewise, the MIFSH contains sixteen subscriber or inter-station lines. The transmission speed of the lines accommodated by the HIFSH and MIFSH is, for example, 622 Mbps through the HIFSH and less than 156 Mbps through the MIFSH.

The cell concentration shelf (CCRSH) has the concentration and distribution capabilities. That is, the output lines of the HIFSH and MIFSH are concentrated and connected to the switching unit, and the output line of the switching unit is distributed and connected to the HIFSH and MIFSH.

The body of the switching unit is designed as a 3-stage configuration and comprises a cell routing switch shelf A (CRSWSH-A) and a cell routing switch shelf B (CRSWSH-B). The CRSWSH-A comprises a first-stage and third-stage switching modules while the CRSWSH-B comprises a second-stage switching module. The first and third stages shown in FIG. 8 respectively correspond to the input and output stages shown in FIG. 7, and the second stage corresponds to an intermediate stage.

Each processor (PR) is provided for two switching module at the first and third stages commonly and manages the switching modules. In the case shown in FIG. 8, eight switching modules are provided in each of the first and third stages, They are also provided with eight processors (PR). The number of switching modules in the first and third stages can be easily changed because one PR and two switching modules are added or deleted as one group. The switching module in the second stage is controlled by one main processor (MPR). The MPR is connected to the processor PR for controlling each of the switching modules of the CRSWSH-A to control the entire switching unit by referring to the operations of other PRs.

The control is integrally performed by the MPR, that is, in a call process. In this process, a call is received from a subscriber, a path is established, a band is managed, a termination process is made, the path is released, the band is restored, etc.

Each of the HIFSH, MIFSH, CCRSH, CRSWSH-A, CRSWSH-B is provided in twos for fault tolerance.

With the above described configuration, the cells are transferred in the switch through the following route. The header, etc. of the cell transferred through the subscriber or inter-station line is converted by the MIFSH or HIFSH, and is input to the switching unit through the CCRSH. In the switching unit, the cell is switched in the first, second, and third stages sequentially in this order. The cell output from the third stage is transferred again to the CCRSH, and output to a predetermined subscriber or inter-station line through the MIFSH or HIFSH depending on the destination.

Figure 9A:
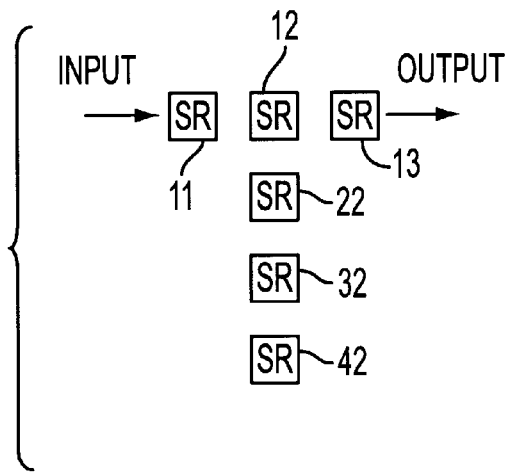
FIGS. 9A through 9D show the procedure of extending the MSSR switch of the middle-scale switching unit according to the stepwise 2nd-stage full extension method, and respectively show the configurations for 20 Gbps, 40 Gbps, 60 Gbps, and 80 Gbps.

FIGS. 9A through 9D show the procedures in which the stepwise 2nd-stage full extension method is applied to the middle-scale switching unit. FIG. 9A shows the configuration of the SR module of the MSSR switch having a switching capacity of 20 Gbps. As shown in FIG. 9A, the first and third stages of the MSSR switch are respectively provided with the SR module 11 and the SR module 13. Four SR modules 12, 22, 32, and 42 are provided at the second stage. As shown in FIG. 10, eight outputs of the SR module 11 are connected to the four SR modules 12, 22, 32, and 42 of the second stage, via two cables for each module between the first and second stages. Between the second and third stages, the eight inputs are connected from the four modules in the second stage to the SR module 13 via two cables for each module.

Thus, the cables connecting the SR modules are used in 2-cable units. The connection between the first and second stages is in symmetry with that between the second and third stages (the second stage shows a regular configuration). Therefore, the cell output after switching by the SR module 11 is switched by one of the four SR modules in the second stage. This cell is not discarded but is transferred to the SR module 13 in the third stage. Accordingly, its block rate is 0%. The MSSR switch can perform switch and connect operation to the maximum switching capacity. That is, the MSSR switch sets calls until the sum of bands requested by the calls approaches 20 Gbps.

Figure 9B:
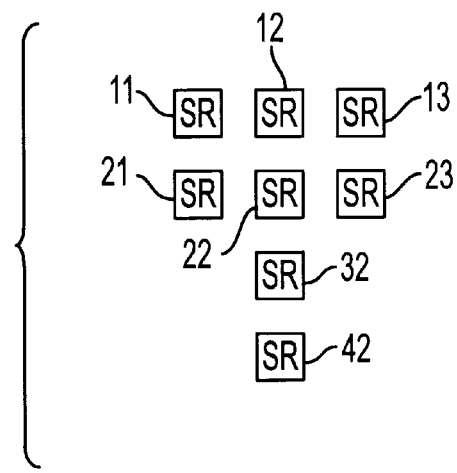
Figure 10:
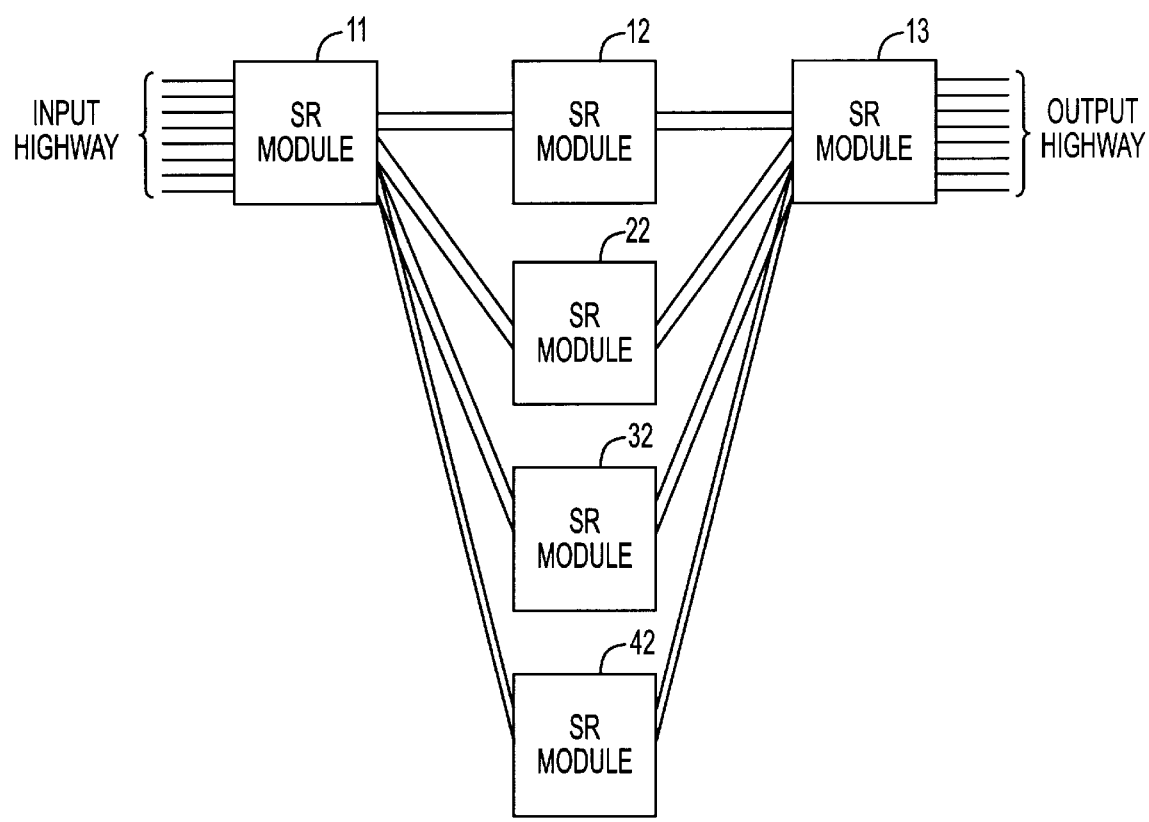
FIG. 10 shows the connection of the cables when the switching capacity is 20 Gbps.
Figure 11:
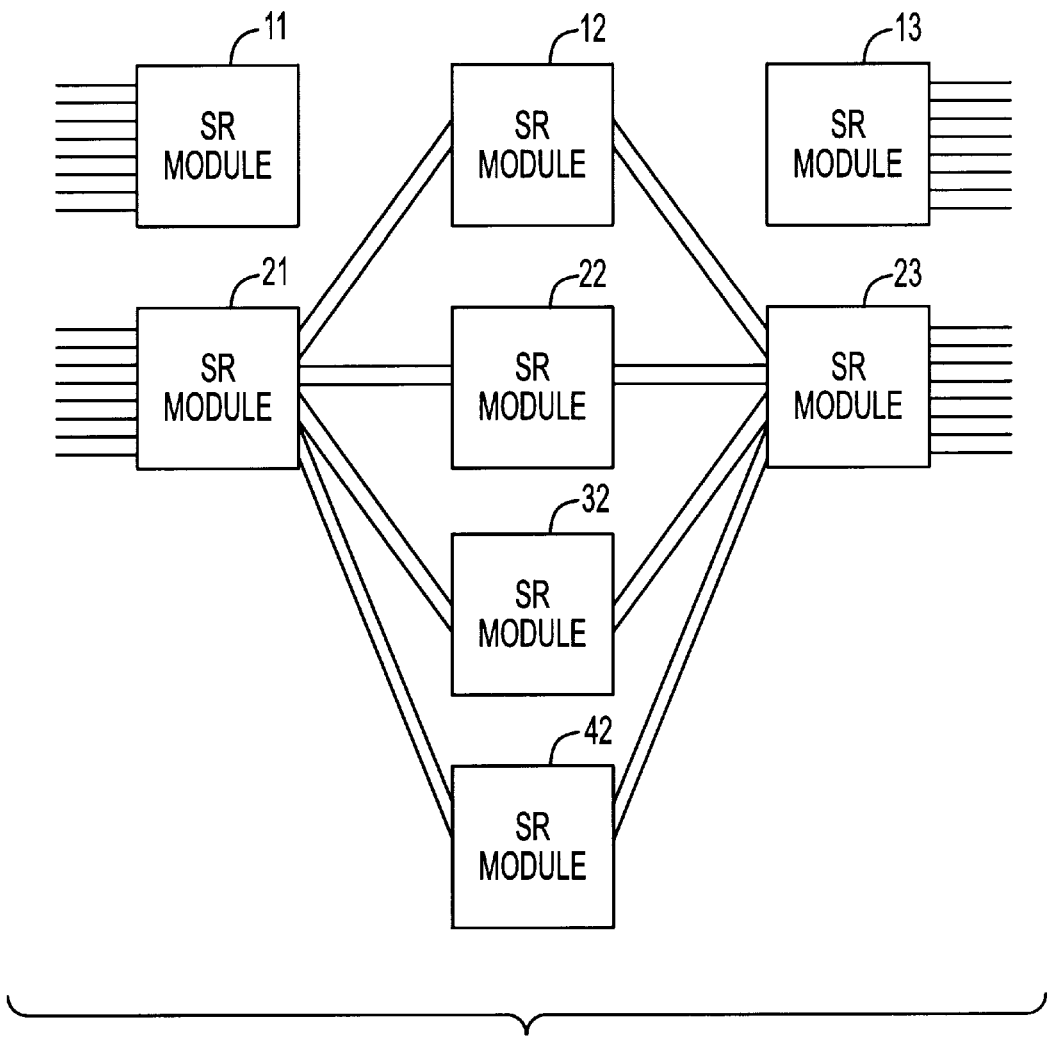
FIG. 11 shows the connection of the cables when the switching capacity is 40 Gbps.

When the switching capacity is extended to 40 Gbps, the first and third SR modules of the MSSR switch are designed in a 2-row configuration as shown in FIG. 9B. That is, the SR modules 21 and 23 are provided in the first and third stages respectively. FIG. 11 shows the connection of the cables. In the 40 Gbps MSSR switch, the eight outputs of the SR module 21 are connected to the four SR modules 12, 22, 32, and 42 in the second stage via 2 cables for each module. The eight inputs to the SR module 23 are connected to the four SR modules at the second stage via two cables for each module. In FIG. 11, the cables are omitted between the SR modules 11 or 13 and the four SR modules in the second stage for clarity of the figure but in practice the cables shown in FIG. 10 are used.

Thus, the MSSR switch with the switching capacity extended to 40 Gbps has double cables for connection to each SR module, and the cable connection between the first and second stages is in symmetry with that between the second and third stages. Therefore, the block rate is 0% and the switching and connecting processes are performed to the maximum switching capacity. When the switching capacity of the MSSR switch is extended from 20 Gbps to 40 Gbps, only the cables between the SR module 21 or 23 and the four SR modules in the second stage are required. That is, the extension can be completed without reassigning the cables used in the configuration for 20 Gbps.

Figure 9C:
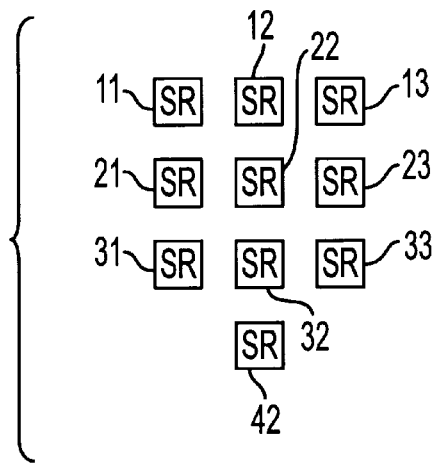

When the capacity of the MSSR switch is extended to 60 Gbps, the SR modules are designed in a 3-row configuration by providing the SR modules 31 and 33 in the first and third stages respectively as shown in FIG. 9C. The connection of the cables is made as shown in FIG. 11 such that double cables connect the newly provided SR modules in the first and third stages to the four SR modules in the second stage.

Figure 9D:
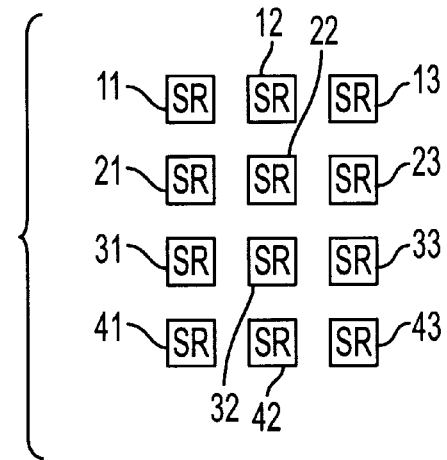

When the capacity of the MSSR switch is extended to 80 Gbps, the SR modules are designed in a 4-row configuration by providing the SR modules 41 and 43 in the first and third stages respectively as shown in FIG. 9D. The connection of the cables is made as shown in FIG. 11 such that double cables connect the newly provided SR modules in the first and third stages to the four SR modules in the second stage.

Thus, the MSSR switch with the switching capacity extended to 60 or 80 Gbps has double cables for connection to each SR module, and the cable connection between the first and second stages is in symmetry with that between the second and third stages. Therefore, the block rate is 0% and the switching and connecting processes are performed to the maximum switching capacity. The switching capacity of the MSSR switch can be extended simply by connecting additional cables, after providing the SR modules in the first and third stages, without reassigning the existing cables or paths in the MSSR switch.

The stepwise 2nd-stage full extension method thus enables the capacity of the MSSR switch to be sequentially extended from 20 to 80 Gbps at a 0% block rate for each capacity without reassigning the cables.

FIGS. 12A through 12D show the procedures in which the stepwise 2nd-stage full extension method is applied to a large-scale switching unit. The switching capacity of the large-scale switching unit is 100 Gbps at the time of initial operation.

FIG. 12A shows the configuration of the SR module of the MSSR switch having a switching capacity of 100 Gbps. As shown in FIG. 12A, the first and third stages of the MSSR switch are provided with five SR modules each to realize the switching capacity of 100 Gbps. Eight SR modules 12, 22, 32, 42, 52, 62, 72, and 82 are provided in the second stage. Between the first and second stages, eight outputs from each SR module in the first stage are connected to the eight SR modules in the second stage via one cable for each module. Between the second and third stages, the eight inputs of each SR module in the third stage are connected to the eight modules in the second stage via one cable for each module.

Thus, the cables connecting the SR modules are used individually. The connection between the first and second stages is in symmetry with that between the second and third stages. Accordingly, the block rate is 0%, and the MSSR switch can perform switch and connect operation to the maximum switching capacity.

When the switching capacity is extended to 120 Gbps, SR modules 61 and 63 are provided in the first and third stages of the MSSR switch for a 6-row configuration as shown in FIG. 12B. The 8 outputs of the SR module 61 are connected to the eight SR modules in the second stage. The eight inputs to the SR module 63 are connected to the eight SR modules in the second stage. The cables between the SR modules 11, 21, 31, 41, or 51, or the SR modules 13, 23, 33, 43, or 53 and the eight SR modules in the second stage are those used when the switching capacity is 100 Gbps.

With the MSSR switch having the switching capacity extended to 120 Gbps, the cables connecting the SR modules are used individually. The connection between the first and second stages is in symmetry with that between the second and third stages. Accordingly, the block rate is 0%, and the MSSR switch can perform switch and connect operation to the maximum switching capacity. The capacity of the MSSR switch can be extended from 100 Gbps to 120 Gbps simply by connecting the cables between the SR module 61 or 63 to the eight SR modules in the second stage. That is, the extension can be completed without reassigning the cables used in the configuration for 100 Gbps.

When the capacity of the MSSR switch is extended from 120 Gbps to 140 Gbps, the SR modules are designed in a 7-row configuration by providing the SR modules 71 and 73 in the first and third stages respectively as shown in FIG. 12C. The connection of the cables is made as described above such that each cable connects the newly provided SR modules in the first and third stages to the eight SR modules in the second stage.

When the capacity of the MSSR switch is extended to 160 Gbps, the SR modules are designed in a 8-row configuration by providing the SR modules 81 and 83 in the first and third stages respectively as shown in FIG. 12D. The connection of the cables is made as described above such that each cable connects the newly provided SR modules in the first and third stages to the eight SR modules in the second stage.

With the MSSR switch having the switching capacity extended to 140 or 160 Gbps, the cables connecting the SR modules are used individually. The connection between the first and second stages is in symmetry with that between the second and third stages. Accordingly, the block rate is 0%, and the MSSR switch can perform switch and connect operation to the maximum switching capacity. The switching capacity of the MSSR switch can be extended simply by connecting additional cables, after providing the SR modules in the first and third stages, without reassigning the cables or paths in the MSSR switch.

The stepwise 2nd-stage full extension method thus enables the capacity of the MSSR switch to be sequentially extended from 100 to 160 Gbps at a 0% block rate for each capacity without reassigning the cables.

As described above, the number of SR modules in the second stage of the MSSR switch is a divisor of the number of inputs/outputs of the SR module according to the stepwise 2nd-stage full extension method. Accordingly, the eight inputs or outputs of each SR module in the first or third stage are divided equally for connection to each SR module in the second stage. For example, in the above described middle-scale switching unit, four SR modules are provided in the second stage of the MSSR switch, and the eight inputs or outputs of each SR module in the first or third stage are connected in pairs to each SR module in the second stage. Thus, the connection between the first and second stages is in symmetry with that between the second and third stages (the second stage shows a regular configuration), and the block rate is 0%. The number of inputs/outputs of the SR module should be a value other than a prime number, because a prime number turns the stepwise 2nd-stage full extension method into the 2nd-stage full extension method.

According to the stepwise 2nd-stage full extension method in the present embodiment, four SR modules are provided in the second stage of the MSSR switch of the middle-scale switching unit. Therefore, each SR module in the second stage is connected to two input/output cables when the switching capacity is, for example, 20 Gbps. Each SR module in the second stage uses only a few part of the available 64 switch elements. That is, many of the switch elements remain unused in each SR module in the second stage. That is, most of the switch elements of each SR module in the second stage are unused.

In this situation, each SR module consists of a plurality of switch blocks. In the example shown in FIG. 13A, four switch blocks each having 4×4 switching elements produce an 8×8-element SR module. In the example shown in FIG. 13B, two switch blocks each having 8×4 switching elements produce an 8×8-element SR module. Depending on the required capacity of the MSSR switch, a set of only the necessary number of switch blocks (a partially-implemented SR module) are substituted for an 8×8-element SR module in predetermined positions of the MSSR switch.

Figure 14:
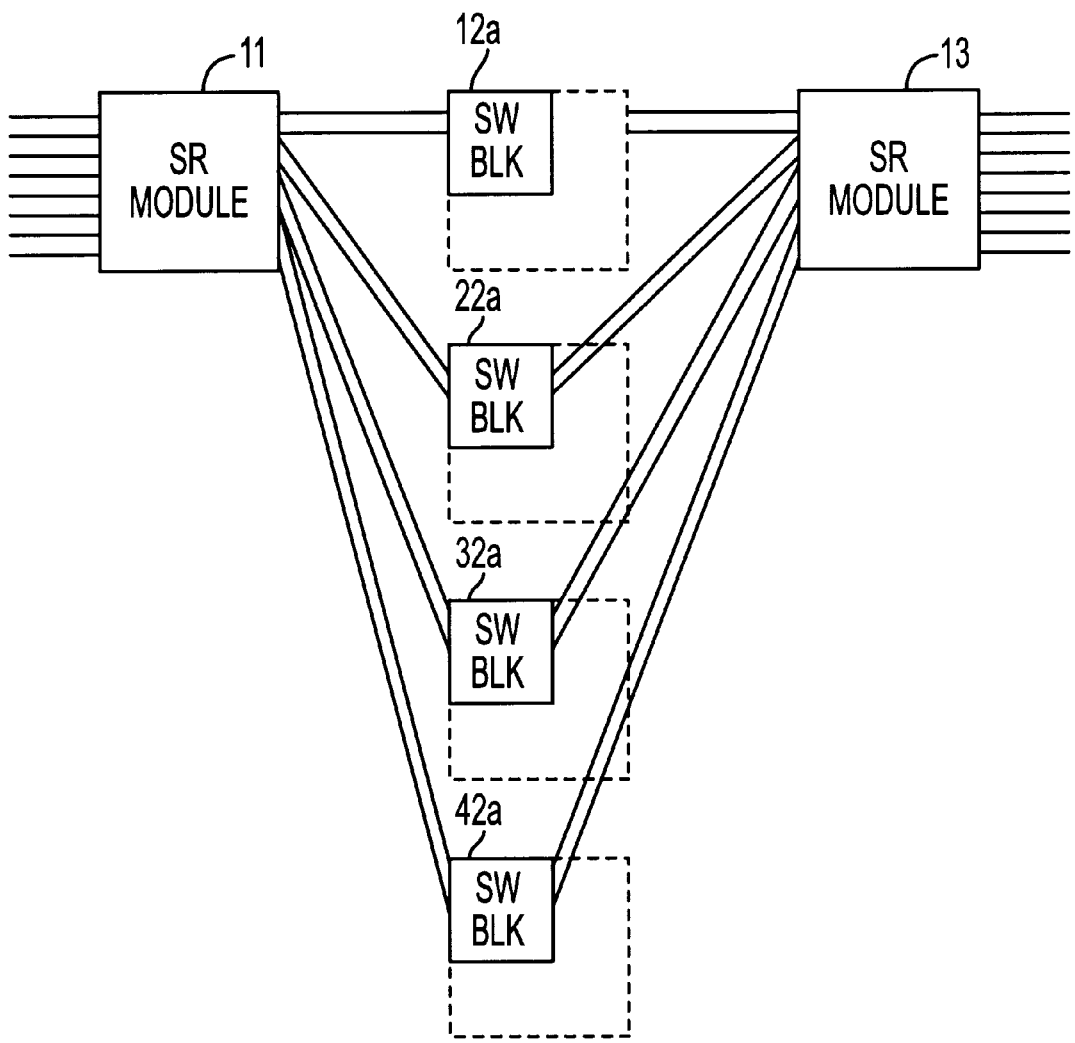
FIG. 14 shows the configuration of the SR module with a 20 Gbps switching capacity realized by providing a partially-implemented SR module in the second stage of the MSSR switch.

FIG. 14 shows the configuration for realizing a switching capacity of 20 Gbps by providing a partially-implemented SR module in the second stage of the MSSR switch.

Figure 13A:
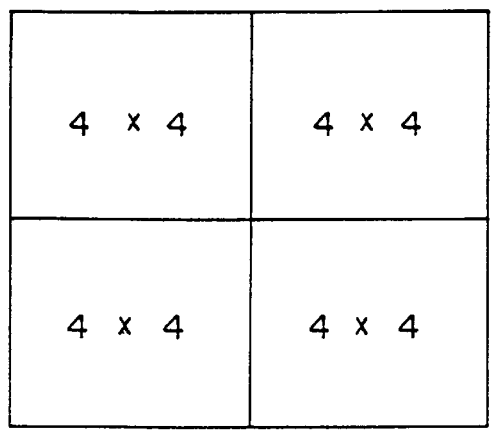
FIG. 13A shows the configuration of the SR module as a combination of 4×4 blocks.

In FIG. 14, a 4×4-element switch block shown in FIG. 13A is provided as a partially-implemented module. Each partially-implemented module has a switch block 12a, 22a, 32a, or 42a. The eight outputs of the SR module 11 in the first stage are connected in pairs to each switch block 12a, 22a, 32a, or 42a. The eight inputs to the SR module 13 in the third stage are connected in pairs to the above described four switch blocks.

When the capacity of the above described MSSR switch is extended to 40 Gbps, the SR modules 21 and 23 are provided in the first and third stages of the MSSR switch as in the procedure shown in FIG. 11. The newly provided two SR modules are connected to the four switch blocks 12a, 22a, 32a, and 42a via two cables for each of the switch blocks. At this time, cables are not reassigned.

Thus, with the configuration of this embodiment, the MSSR switch having a switching capacity of 20 Gbps or 40 Gbps can be realized by providing the partially-implemented modules, each of which is configured by arranging the necessary number of 4×4- or 8×4-element switch blocks in the second stage of the MSSR switch. Since the production cost of each switching element forming part of the SR module (switch block) is very high, the partially-implemented module can be used to reduce the number of switching elements used in the second stage of the MSSR switch. Thus, the entire cost of the MSSR switch can be reduced considerably.

Figure 13B:
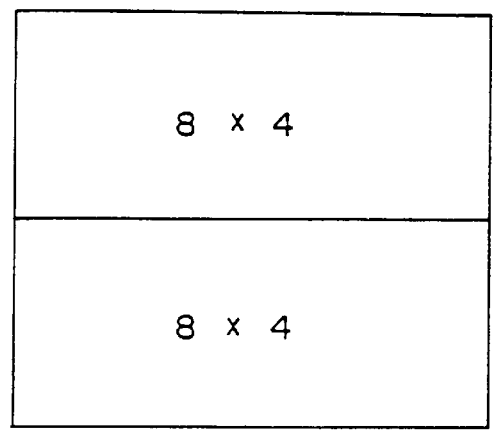
FIG. 13B shows the configuration of the SR module as a combination of 8×4 blocks.

With the configuration in which an 8×8-element SR module is formed by combining the switch blocks shown in FIGS. 13A and 13B, the capacity of the MSSR switch is extended to 60 or 80 Gbps by fully implementing the switch blocks. That is, to form an 8×8-element SR module, four switch blocks are implemented when each switch block has a 4×4-element configuration, or two switch blocks are implemented when each switch block has an 8×4-element configuration. When an MSSR switch having the switching capacity of 20 or 40 Gbps is produced, the cables connecting the SR modules in the first and third stages to the four switch blocks 12a, 22a, 32a, and 42a in the second stage are used as is, thereby requiring no reassignment of the cables.

Described below is the 2nd-stage irregular extension method, that is, another extension method according to the present invention by referring to FIGS. 15A–15D. In the 2nd-stage irregular extension method, the number of rows of the SR modules in the second stage of the MSSR switch is determined such that the block rate shown in Table 1 is 0%. That is, the number of SR modules in the second stage of the MSSR switch is extended sequentially to 2, 4, and 8.

Figure 15A:
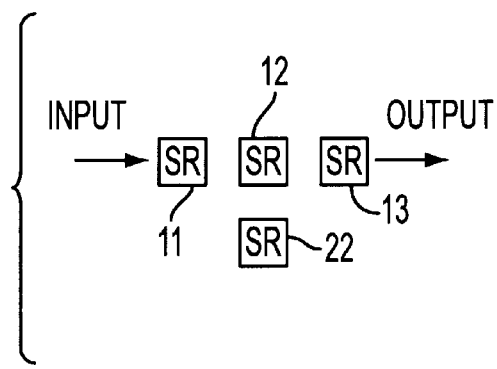
FIGS. 15A through 15D show the 2nd-stage irregular extension method, each for 20 Gbps, 40 Gbps, 60 Gbps, and 80 Gbps.
Figure 15B:
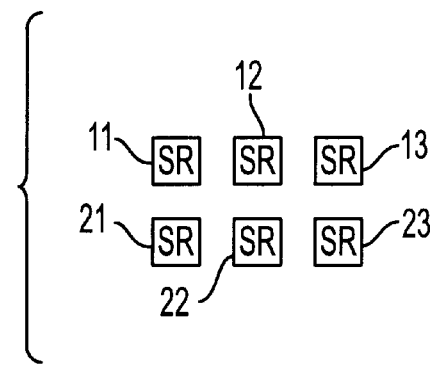
Figure 15C:
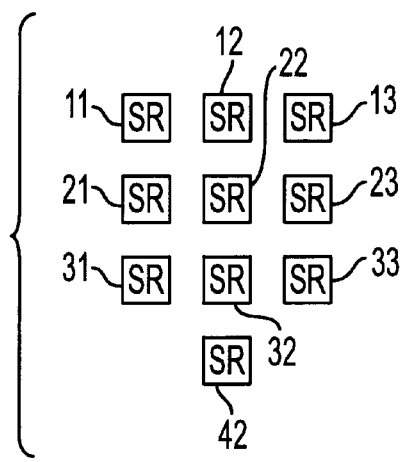
Figure 15D:
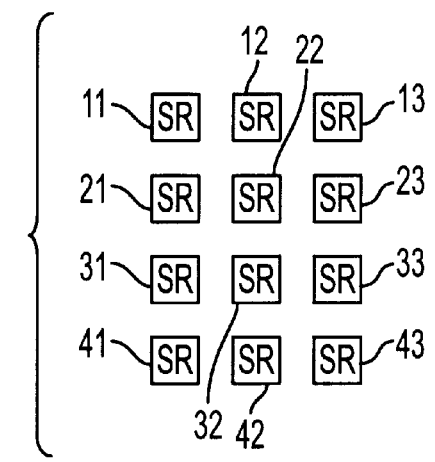

According to this method, the capacity can be extended from 20 Gbps to 40 Gbps without reassigning the cables, as shown in FIGS. 15A and 15B when the number of SR modules in the second stage of the MSSR switch is two. When the capacity of the MSSR switch is extended from 40 Gbps to 60 Gbps using the 2nd-stage irregular extension method, the number of the SR modules in the second stage is four as shown in FIG. 15C, and the number of the SR modules in the first and third stages is 3 in each stage. But this extension requires reassigning cables. Furthermore, if the capacity of the MSSR switch is extended from 60 to 80 Gbps, then an SR module is added to the first and third stages as shown in FIG. 15D. The cables are not reassigned.

When the capacity of the MSSR switch is extended to 100 Gbps or more using the 2nd-stage irregular extension method, the number of the SR modules in the second stage of the MSSR switch is eight. Therefore, the procedure followed when the capacity of the MSSR switch is extended to 100–160 Gbps is the stepwise 2nd-stage full extension method shown in FIGS. 12A thorough 12D.

The simple extension method and 2nd-stage full extension method explained above as the conventional extension methods are compared with the stepwise 2nd-stage full extension method and 2nd-stage irregular extension method which are the extension methods according to the present invention. The evaluation items are a block rate, necessity of a path reassignment, necessity of cable reassignment, and cost. Table 2 shows the evaluation results.

TABLE 2

| ITEM | SIMPLE EXTENSION | 2ND-STAGE FULL EXTENSION METHOD | 2ND-STAGE IRREGULAR EXTENSION METHOD | STEPWISE 2ND-STAGE FULL EXTENSION METHOD |
|---|---|---|---|---|
| BLOCK RATE | X | ○ | ○ | ○ |
| REASSIGMENT OF PATH | X | ○ | ○ | ○ |
| REASSIGMENT OF CABLE | X | ○ | X | ○ |
| COST | ○ | X | Δ | Δ |

As shown in Table 2, the stepwise 2nd-stage full extension method scores high points for each item. That is, according to the stepwise 2nd-stage full extension method, the block rate is 0% in the range of 20–160 Gbps (1-row through 8-row configuration). When the capacity of the MSSR switch is to be extended in the range of 20–80 Gbps and in the range of 100 through 160 Gbps, cables are not reassigned. However, the cables should be reassigned when the capacity is extended from 80 Gbps to 100 Gbps. Nevertheless, since it is predicted that the switching unit can be either the size of 50–100 Gbps or the size of 100–150 Gbps as described above, it is rare to extend the capacity from 80 to 100 Gbps. Therefore, the evaluation of the necessity of cable reassignment in the stepwise 2nd-stage full extension method is marked as "good: represented by ○".

The cost required in the stepwise 2nd-stage full extension method is compared with that required in the simple extension method. Since the number of SR modules in the second stage required in the stepwise 2nd-stage full extension method is larger than that required in the simple extension method, except in the case of the 4-row or 8-row configurations, the stepwise 2nd-stage full extension method costs more than the simple extension method. However, if the MSSR switch is extended using the simple extension method, the block rate may indicate a value other than 0% as shown in Table 1, thereby causing the use rate of the MSSR switch to be reduced. Considering the reduction in use rate, the actual cost performance of the simple extension method can be calculated by multiplication by 0.875 or 0.75. Therefore, the actual cost of the stepwise 2nd-stage full extension method is not so much higher than that of the simple extension method.

When the cost required in the stepwise 2nd-stage full extension method is compared with that required in the 2nd-stage full extension method, the number of the SR modules in the second stage in the 1- through 4-row configurations (20–80 Gbps) is smaller in the stepwise 2nd-stage full extension method than in the 2nd-stage full extension method. Therefore, the stepwise 2nd-stage full extension method costs less than the 2nd-stage full extension method. As a result, the cost evaluation of the stepwise 2nd-stage full extension method is marked with "medium: represented by Δ". Table 3 shows the cost comparison among the above listed methods.

TABLE 3

| NUMBER OF ROWS | SIMPLE EXTENSION | 2ND-STAGE IRREGULAR EXTENSION METHOD | 2ND-STAGE FULL EXTENSION METHOD | STEPWISE 2ND-STAGE FULL EXTENSION METHOD |
|---|---|---|---|---|
| 1 | 1.00 (3) | 1.33 (4) | 3.33 (10) | 2.00 (6) |
| 2 | 1.00 (6) | 1.00 (6) | 2.00 (12) | 1.33 (8) |
| 3 | 1.00 (9) | 1.11 (10) | 1.56 (14) | 1.11 (10) |
| 4 | 1.00 (12) | 1.00 (12) | 1.33 (16) | 1.00 (12) |
| 5 | 1.00 (15) | 1.20 (18) | 1.20 (18) | 1.20 (18) |
| 6 | 1.00 (18) | 1.11 (20) | 1.11 (20) | 1.11 (20) |
| 7 | 1.00 (21) | 1.05 (22) | 1.05 (22) | 1.05 (22) |
| 8 | 1.00 (24) | 1.00 (24) | 1.00 (24) | 1.00 (24) |

The numbers in ( ) indicate the number of SR modules.

Though normally accompanied by a slightly higher cost, the stepwise 2nd-stage full extension method is not inferior in actual cost performance to the simple extension method. Relating to the block rate, necessity of path reassignment, and necessity of cable reassignment, the stepwise 2nd-stage full extension method is advantageous over the simple extension method, and provides a merit of an easier extension process. When the stepwise 2nd-stage full extension method is compared with the 2nd-stage full extension method, they are almost equal in the ease of the extension process, but the stepwise 2nd-stage full extension method can reduce the cost, especially when the number of rows is 4 or less (80 Gbps or less).

The 3-stage MSSR switch has been described based on the above mentioned embodiment, but the present invention is not limited to this configuration. For example, when the present invention is applied to the 5-stage MSSR switch, the second through fourth stages are fully implemented. That is, in the middle-scale switching unit, fourth SR modules each are provided at the second through fourth stages. In a large-scale switching unit, eight SR modules each are provided for the second through fourth stages.

According to the above described embodiment, each SR module has 8×8 switching elements. However, the present invention is not limited to this configuration. For example, each module can have elements in other matrices such as 4×4- and 16×16-element matrices. The present invention can also be applied to the SR modules in the form of shared memory.

According to the present invention, a stepwise switching method has been applied depending on the size of the switching unit. Therefore, the cable reassigning operation performed when the switch is extended can be minimal, thereby reducing burden of the extending work and reducing the cost required by the new switch configuration.

Having described a specific embodiment of our bearing, it is believed obvious that modification and variation of our invention is possible in light of the above teachings.

What is claimed is:

1. A multistage connection switch which is connectable to an extension switch, comprising:

an input stage having at least one switching module with N input/output terminals, an output stage having at least one switching module with N input/output terminals, and an intermediate stage, provided between said input stage and output stage, having at least one stage in which switching modules each having N input/output terminals are provided, the number of the switching modules being a divisor of N and corresponding to an estimated largest switching scale, wherein:

each of the output terminals of the switching module in said input stage is connected to a respective one of a plurality of input terminals of one of the switching modules in said intermediate state;

the rest of the input terminals of each of the switching modules in said intermediate stage remain unconnected, providing for connection to an output terminal of a switching module to be provided in said input stage for extension;

each of the input terminals of the switching module in said output stage is connected to a respective one of a plurality of output terminals of one of the switching modules in said intermediate stage; and the rest of the output terminals of each of the switching modules in said intermediate stage remain unconnected, providing for connection to an input terminal of a switching module to be provided in said output stage for extension.

2. The multistage connection switch according to claim 1, wherein said switching module has N (an integer) inputs and the outputs; and each stage in the intermediate stage comprises a number of a divisor of the N of the switching modules.

3. A multistage connection switch connectable to an extension switch, comprising:

an input stage having at least one switching module, an output stage having at least one switching module, and an intermediate stage, provided between said input stage and output stage, having at least one stage in which sub-switching modules of a number corresponding to an estimated largest switching scale are provided, the sub-switching modules being a part of the switching modules provided in said input stage and output stage, wherein:

each output terminal of the switching module in said input stage is connected to a respective one of a plurality of input terminals of one of the sub-switching modules in said intermediate stage;

the rest of the input terminals of each of the sub-switching modules in said intermediate stage remain unconnected, providing for connection to an output terminal of a switching module to be provided in said input stage for extension;

each input terminal of the switching module in said output stage is connected to one a respective of a plurality of output terminals of one of the sub-switching modules in said intermediate stage; and the rest of the output terminals of each of the sub-switching modules in said intermediate stage remain unconnected, providing for connection to an input terminal of a switching module to be provided in said output stage for extension.

* * * * *